March 20, 1951  J. J. PESQUEIRA ET AL  2,545,858
HEADSTOCK AND SPINDLE

Filed Nov. 13, 1945  3 Sheets-Sheet 1

INVENTORS
Juventino J. Pesqueira
and Robert Kurzweil
BY
J. B. Felshin
ATTORNEY

March 20, 1951　　J. J. PESQUEIRA ET AL　　2,545,858
HEADSTOCK AND SPINDLE

Filed Nov. 13, 1945　　　　　　　　　　3 Sheets-Sheet 3

INVENTORS
Juventino J. Pesqueira
and Robert Kurzweil
BY
J. B. Felshin
ATTORNEY

Patented Mar. 20, 1951

2,545,858

UNITED STATES PATENT OFFICE 2,545,858

HEADSTOCK AND SPINDLE

Juventino Jose Pesqueira and Robert Kurzweil, New York, N. Y., assignors to Morey Machinery Co., Inc., New York, N. Y., a corporation of New York Application November 13, 1945, Serial No. 627,984

12 Claims. (Cl. 82—30)

This invention relates to lathes. It is particularly directed to an improved means on a lathe for driving a work piece, such as a railroad axle or the like articles.

An object of this invention is to provide in a lathe of the character described, a headstock including a spindle, and improved means on the spindle to engage one end of a work piece for driving the same, and including drive spurs engaging said work piece.

A further object of this invention is to provide in a lathe of the character described, comprising a headstock spindle which is rotatably but non-slidably mounted, and including drive buttons or spurs to engage one end of the work piece, and a longitudinally movable and rotatable tailstock spindle, including a friction ram to engage the opposite end of the work piece, and means to longitudinally move the spindle into engagement with said work piece to impose a thrust thereon co-axial of the axle.

Still another object of this invention is to provide spring pressed live centers on both the headstock spindle and tailstock spindle to engage center openings at opposite ends of the work piece whereby to locate said work piece.

Yet another object of this invention is to provide in a lathe of the character described a driving button having one or more parallel teeth or serrations, said teeth having inclined surfaces at 90° to one another, the leading surface of each tooth being disposed at a 60° angle to the adjacent surface of the work piece, and the following surface of said tooth being disposed at 30° to said work piece surface.

Still a further object of this invention is to provide in a lathe of the character described, a headstock, a spindle rotatably mounted in the headstock by means of bearings, and means including a thrust bearing to take up an axial thrust imposed on the spindle.

Yet another object of this invention is to provide a strong and durable lathe construction of the character described, which shall be relatively inexpensive to manufacture, and yet practical and efficient to a high degree in use.

Other objects of this invention will in part be obvious and in part hereinafter pointed out.

The invention accordingly consists in the features of construction, combinations of elements, and arrangements of parts which will be exemplified in the construction hereinafter described, and of which the scope of application will be indicated in the following claims.

In the accompanying drawing, in which is shown various possible illustrative embodiments of this invention, Fig. 1 is a front elevational view of a lathe embodying the invention;

Figure 1:
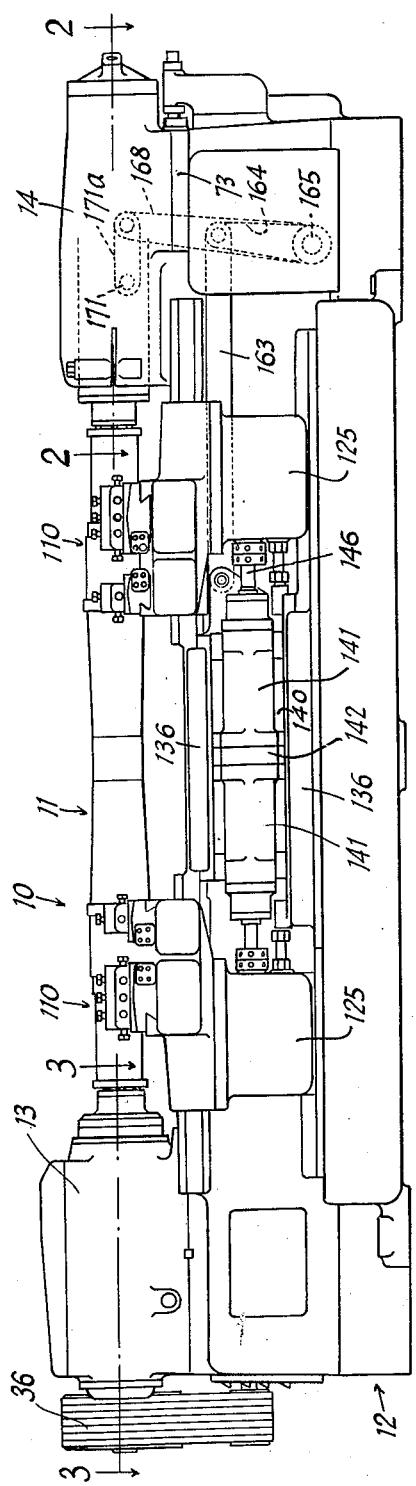

Referring now in detail to the drawing, 10 designates a lathe embodying the invention. The lathe shown in Fig. 1 is described more fully in co-pending application of Juventino J. Pesqueira for Lathes, filed on even date herewith, Serial No. 627,985, and now Patent No. 2,494,196, granted January 10, 1950.

Said lathe is for turning a work piece 11, such as a railroad car axle, or the like article. Said lathe comprises generally of a base or frame 12, a headstock 13, and a tailstock 14.

Figure 3:
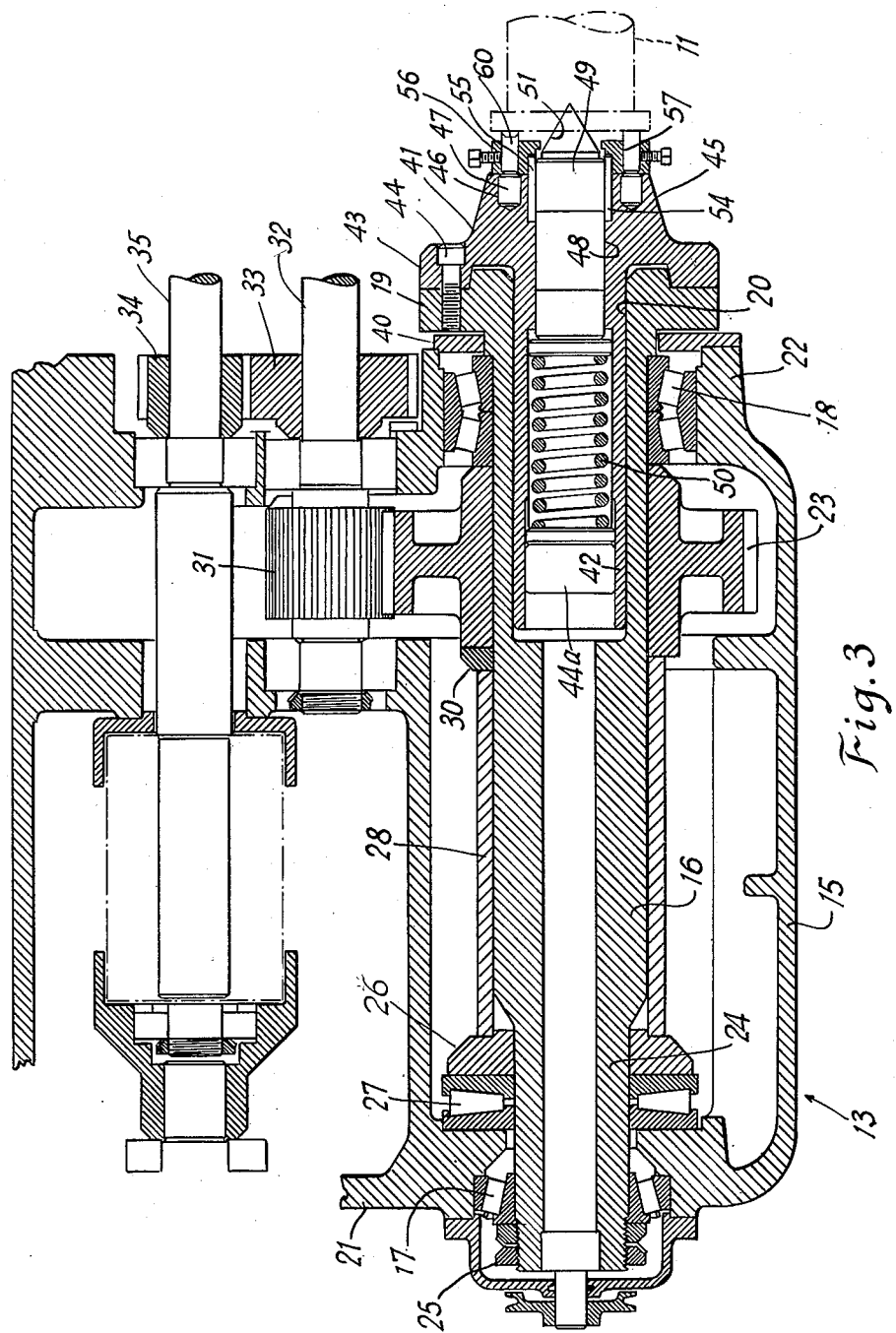
Fig. 3 is an elevational cross-sectional view taken on line 3—3 of Fig. 1.
Figure 4:
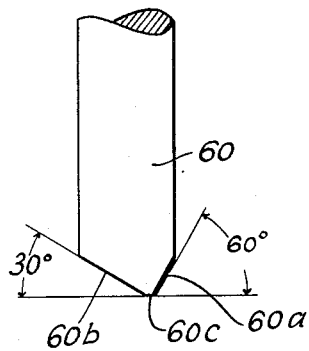
Fig. 4 is a side view of one of the spur drives.
Figure 6:
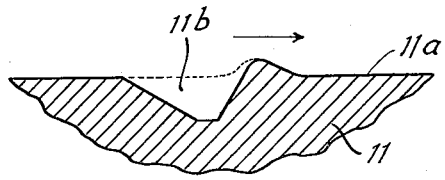
Fig. 6 is a cross-sectional view through one end of the work piece showing the indentation formed therein.
Figure 5:
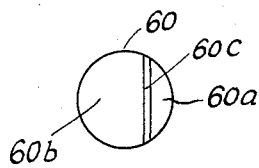
Fig. 5 is a bottom plan view of the structure shown in Fig. 4.
Figure 7:
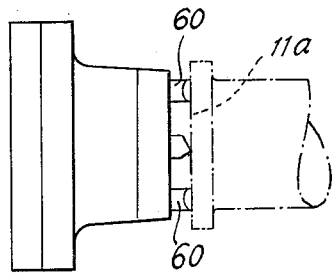
Fig. 7 is a side elevational view of one end of the spindle drive.

The headstock 13 comprises a headstock casing 15 on which is mounted a horizontal hollow spindle 16 supported on the rear roller bearing 17 and a front roller bearing 18. The spindle 16 is formed at its front end with an annular outwardly extending flange 19 and with a center counterbore 20. The rear roller bearing 17 is located in the rear wall 21 of the headstock casing, whereas the roller bearing 18 is located within the front wall 22 of said casing. Fixed to the spindle is a gear 23 located within the headstock casing. The spindle 16 is formed with a reduced rear end portion 24 provided with a take-up nut 25 at its rear end. On the reduced end portion 24 of the spindle is a collar 26. Interposed between the collar 26 and the rear wall 21 is a thrust roller bearing 27. Interposed between the collar 26 and gear 23 is a thrust sleeve 28 disposed about the spindle 16. Sleeve 28 is keyed to gear 23 by a key 30. It will now be understood that thrust on the spindle to the left, looking at Fig. 3, will be taken up by the thrust bearing 27.

Gear 23 meshes with a gear 31 on the shaft 32 journalled in the headstock casing. On shaft 32 is a gear 33 meshing with a gear 34 on a shaft 35, likewise journalled in the headstock casing. The shafts 32 and 35 are parallel to the spindle. The shaft 35 may be driven in any suitable manner by means of a drive belt 36. Attached to the front wall 22 of the headstock casing is a plate 40 to enclose the roller bearing 18.

Mounted on the front end of the spindle is a nose 41. Nose 41 is formed with a sleeve portion 42 disposed within opening 20. It is formed with an outwardly extending flange 43, attached by screws 44 to flange 19.

Screwed within the rear end of sleeve 42 is a nut 44a. At the forward end of the nose 41 is a head 45 provided with a plurality of annularly arranged spaced openings 46 extending to the front end of said head. Within each opening 46 is a hardened pin 47. Said nose 41 is formed at its forward end with a through opening 48 in which is inserted a line center 49. Interposed between the center 49 and the nut 44a is a coil compression spring 50. Center 49 is adapted to engage a center hole 51 in one end of the axle 11. The head 45 is formed internally with an annular recess 54, receiving a bushing 55, extending forwardly beyond said head.

Contacting the nose 41 is a ram ring 56 surrounding the center 49. The ring 56 is formed with a plurality of annularly spaced through openings 57 in each of which is a spur or depressing button 60. Each spur or button 60 contacts one of the hardened pins 47. The buttons 60 are adapted to dig into one end of the axle. It will now be understood that when the spindle is driven the axle will be rotated due to engagement of the spurs 60 with said axle. The center 49 is spring loaded and pressed into the center opening of the axle.

Tailstock 14 comprises a cylindrical housing 75 open at opposite ends. Attached to the rear end of housing 75, is a cover 78 formed with a pair of passages 79 and 80. Slidably mounted in the housing 75 is a quill 81 formed with an intermediate transverse wall 82 and with cylindrical walls 83 and 84 extending in opposite directions relative to said transverse wall. Attached to the rear end of the cylindrical wall 83 is a cap or head 85 formed with a central through opening 86. Fixed to the head or cover 78 is a central, forwardly extending shaft or piston rod 87. Attached to the forward end of shaft 87 is a piston 88 on which the cylinder 83 is slidable. Shaft 87 passes through said central opening 86 in the head 85. Said shaft is formed with a longitudinal passage 90 communicating with opening 79 and terminating in an opening 91 which leads to the interior of cylinder 83, and between piston 88 and cap 85. Said shaft 87 is formed with another longitudinal through passage 93 communicating with opening 80 and leading to the rear end of said shaft thereby communicating with the interior of cylinder 83 between piston 88 and partitions 82.

Figure 2:
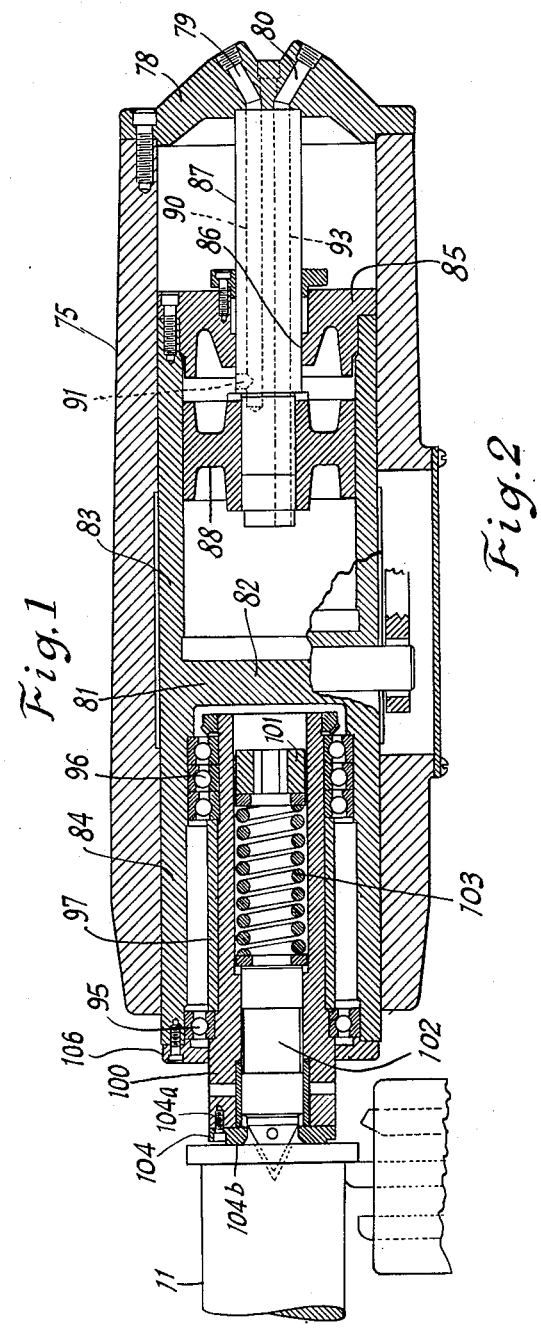
Fig. 2 is a cross-sectional view taken on line 2—2 of Fig. 1.

It will now be understood that when hydraulic medium is fed under pressure to passage 79, quill 81 will be retracted or moved to the right, looking at Fig. 2 of the drawing. When the hydraulic medium is fed to opening 80 under pressure, quill 81 will move forwardly to the left, looking at Fig. 2 of the drawing.

Within cylinder 84 are spaced ball bearings 95 and 96 separated by a spacing sleeve 97. Rotatably and non slidably mounted in the bearing is a tailstock spindle 100. The spindle 100 passes through the sleeve 97. Said spindle 100 is in the form of a tube or sleeve. Screwed into the rear end thereof is a nut 101. Rotatably mounted in the forward end of said spindle is a center 102. Interposed between nut 101 and center 102, is a coil compression spring 103. The compression spring 103 presses the center 102 into the center opening of the axle or work piece 11. Spindle 100 is formed with an annular counterbored groove receiving a bushing 100a serving as a bearing for center 102. Attached to the forward end of the spindle 100 is a ram 104 adapted to frictionally contact the adjacent end of the axle. It will now be understood that while the headstock spindle rotates the axle, the tailstock spindle 100 will rotate with the axle. Attached to the forward end of cylinder 84 is a ring 106 surrounding the spindle 100. It will now also be understood that when oil is fed through opening 80, cylinder 81 will move to the left to cause the ram 104 to move into contact with the axle. The ram 104 is attached to tailstock spindle 100 by means of screws 104a, or like fastening means, and is provided at its front edge with surfaces 104b for frictionally gripping the axle.

Means is provided for turning the axle automatically and symmetrically on both sides of a median line through the axle. The arrangement is such that the axle is turned from the outer ends inwardly. To this end there is provided a pair of similar, symmetrically disposed tool holders 110. The tool holders are similar and symmetrically disposed to one another.

The operation of the tool holders is described in detail in said co-pending application. Stated briefly, the tool holders 110 are slidably mounted on the bed of the lathe and are provided with aprons 125. On the lathe are a pair of guides 136 slidably supporting a slide 140, disposed between the aprons 125. On the slide are oppositely disposed hydraulic cylinders 141 connected together by a common wall 142. In the cylinders are pistons connected to the tool holders by means of piston rods 146. The slide 140 is connected by a horizontal link 163 to arm 164 fixed on shaft 165. Fixed to said shaft is an arm 168 connected by link 171a to a pin 171 on the cylinder 81. Arm 168 is twice the height of arm 164. Movement of cylinder 81 is accompanied by movement of slide 140 half the length of movement of the slide.

Figure 8:
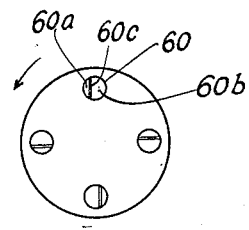
Fig. 8 is a front end view of the spindle drive.

The drive spurs or buttons 60 have inclined faces 60a and 60b and a straight ridge 60c. The ridges 60c are radial, relative to the spindle axis. There are four buttons spaced 90° apart shown in the drawing, although the number and placement may be varied. The driving buttons may be cylindrical or made of round stock. The surface 60a makes an angle of 60° with the adjacent face 11a of the axle 11, whereas the surface 60b makes a 30° angle with said axle face. The surfaces 60a are at the leading sides of the buttons. Thus looking at Fig. 8, the spindle rotates in a counterclockwise direction and the faces 60a are at the leading side of the ridges. It has been found that with such construction, the axle will be firmly gripped and driven. The buttons will produce indentations 11b in the face 11a as thrust is applied by the tailstock hydraulically.

Figure 9:
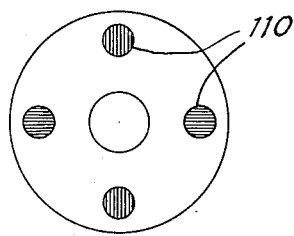
Fig. 9 is a view similar to Fig. 8, but illustrating a modified form of spur drive or driving button.
Figure 10:
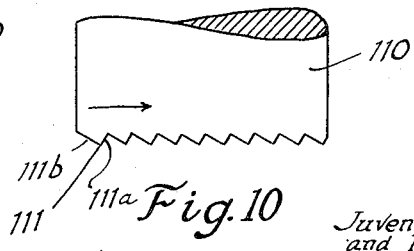
Fig. 10 is a side elevational view of one of the buttons shown in Fig. 9.

In Figs. 9 and 10 there is shown a modified form of button 110. Each button 110 is provided with a plurality of parallel ridges 111. The middle ridge of each button is radial relative to the spindle axis. Each ridge 111 has an inclined face 111a and 111b. The faces 111a are at an angle of 60° to the adjacent face 11a of the axle. The surfaces 111b make an angle of 30° with surfaces 11a of said axle. The inclined faces 111a are at the leading sides of the ridges. The ridges 111 are much smaller than the ridges on the button 60 and therefore make smaller indentations or scratches in the face of the axle.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described our invention, we claim as new and desire to secure by Letters Patent:

1. In a lathe, a headstock comprising a headstock casing having front and rear walls, a pair of aligned bearings within said walls, a spindle rotatably mounted within said bearings, a drive gear fixed to said spindle and disposed within said casing, a thrust bearing disposed about said spindle and located at the inside of the rear wall of said casing, a sleeve surrounding said spindle and interposed between said gear and thrust bearing, said spindle being formed at its forward end with a socket and with an outwardly extending flange, a nose piece at the front end of the spindle comprising a flange contacting the flange of the spindle, and a sleeve projecting into said socket, means to attach said nose piece to said spindle, a spring within said sleeve, and a center within the forward end of said nose piece adapted to press against said spring.

2. In a headstock, a spindle, a nose piece on the spindle, a spring pressed center on said nose piece, said nose piece being formed with a plurality of spaced openings surrounding said center, a hardened pin within each of said openings, a ring on said nose piece, and a plurality of drive buttons carried by said ring and aligned with said pins, each of said buttons having a radial ridge, and inclined surfaces at opposite sides of the ridge.

3. In a headstock, a spindle, a nose piece on the spindle, a spring pressed center on said nose piece, said nose piece being formed with a plurality of spaced openings surrounding said center, a hardened pin within each of said openings, a ring on said nose piece, and a plurality of drive buttons carried by said ring and aligned with said pins, each of said buttons having a radial ridge, and inclined surfaces at opposite sides of the ridge, the leading inclined face of each ridge making an angle of substantially 60° with the adjacent face of a work piece, and the opposite face of said ridge making an angle of substantially 30° with said face of said work piece.

4. In a lathe, a headstock comprising a headstock casing having front and rear walls, a pair of aligned bearings within said walls, a spindle rotatably mounted within said bearings, a drive gear fixed to said spindle and disposed within said casing, a thrust bearing disposed about said spindle and located at the inside of the rear wall of said casing, a sleeve surrounding said spindle and interposed between said gear and thrust bearing, said spindle being formed at its forward end with a socket and with an outwardly extending flange, a nose piece at the front end of the spindle comprising a flange contacting the flange of the spindle, and a sleeve projecting into said socket, means to attach said nose piece to said spindle, a spring within said sleeve, and a center within the forward end of said nose piece adapted to press against said spring, said nose piece being formed with a plurality of spaced openings surrounding said center, a hardened pin within each of said openings, a ring attached to said nose piece and a plurality of drive buttons carried by said ring and aligned with said pins.

5. In a lathe, a headstock comprising a headstock casing having front and rear walls, a pair of aligned bearings within said walls, a spindle rotatably mounted within said bearings, a drive gear fixed to said spindle and disposed within said casing, a thrust bearing disposed about said spindle and located at the inside of the rear wall of said casing, a sleeve surrounding said spindle and interposed between said gear and thrust bearing, said spindle being formed at its forward end with a socket and with an outwardly extending flange, a nose piece at the front end of the spindle comprising a flange contacting the flange of the spindle, and a sleeve projecting into said socket, means to attach said nose piece to said spindle, a spring within said sleeve, and a center within the forward end of said nose piece adapted to press against said spring, said nose piece being formed with a plurality of spaced openings surrounding said center, a hardened pin within each of said openings, a ring attached to said nose piece and a plurality of drive buttons carried by said ring and aligned with said pins, said buttons being removable from said ring and means to secure said buttons on said ring.

6. In a lathe, a headstock comprising a headstock casing having front and rear walls, a pair of aligned bearings within said walls, a spindle rotatably mounted within said bearings, a drive gear fixed to said spindle and disposed within said casing, a thrust bearing disposed about said spindle and located at the inside of the rear wall of said casing, a sleeve surrounding said spindle and interposed between said gear and thrust bearing, said spindle being formed at its forward end with a socket and with an outwardly extending flange, a nose piece at the front end of the spindle comprising a flange contacting the flange of the spindle, and a sleeve projecting into said socket, means to attach said nose piece to said spindle, a spring within said sleeve, and a center within the forward end of said nose piece adapted to press against said spring, said nose piece being formed with a plurality of spaced openings surrounding said center, a hardened pin within each of said openings, a ring attached to said nose piece and a plurality of drive buttons carried by said ring and aligned with said pins, said buttons being removable from said ring and means to secure said buttons on said ring, each of said buttons having a radial ridge, and inclined surfaces at opposite sides of the ridge.

7. In a lathe, a headstock comprising a headstock casing having front and rear walls, a pair of aligned bearings within said walls, a spindle rotatably mounted within said bearings, a drive gear fixed to said spindle and disposed within said casing, a thrust bearing disposed about said spindle and located at the inside of the rear wall of said casing, a sleeve surrounding said spindle and interposed between said gear and thrust bearing, said spindle being formed at its forward end with a socket and with an outwardly extending flange, a nose piece at the front end of the spindle comprising a flange contacting the flange of the spindle, and a sleeve projecting into said socket, means to attach said nose piece to said spindle, a spring within said sleeve, and a center within the forward end of said nose piece adapted to press against said spring, said nose piece being formed with a plurality of spaced openings surrounding said center, a hardened pin within each of said openings, a ring attached to said nose piece and a plurality of drive buttons carried by said ring and aligned with said pins, said buttons being removable from said ring and means to secure said buttons on said ring, each of said buttons having a radial ridge, and inclined surfaces at opposite sides of the ridge, a leading inclined face on each ridge making an angle of substantially 60 degrees with the adjacent face on a work piece, and the opposite face of said ridge making an angle of substantially 30 degrees with said face of said work piece.

8. In a lathe, a headstock comprising a headstock casing having front and rear walls, a pair of aligned bearings within said walls, a spindle rotatably mounted within said bearings, a drive gear fixed to said spindle and disposed within said casing, a thrust bearing disposed about said spindle and located at the inside of the rear wall of said casing, a sleeve surrounding said spindle and interposed between said gear and thrust bearing, said spindle being formed at its forward end with a socket and with an outwardly extending flange, a nose piece at the front end of the spindle comprising a flange contacting the flange of the spindle, and a sleeve projecting into said socket, means to attach said nose piece to said spindle, a spring within said sleeve, and a center within the forward end of said nose piece adapted to press against said spring, a ring fixed to said nose piece and surrounding said center, and a plurality of drive buttons carried by said ring and projecting therefrom.

9. In a lathe, a headstock, a spindle in the headstock, driving means on the spindle adapted to engage one end of a work piece, said driving means on the headstock spindle including driving buttons having ridges adapted to engage one end of the work piece, said buttons having inclined surfaces on opposite sides of the ridges, the surfaces on the leading side making a greater angle with the adjacent surface of the work piece than the surface on the opposite side of said ridge.

10. In a headstock for a lathe, the combination, with a spindle rotatably mounted in the headstock, of a nose piece on the spindle having a plurality of openings extending into the nose piece from the outer end thereof in substantial parallelism to the longitudinal axis of said spindle and equidistantly spaced apart; a spring pressed center on said nose piece; a plurality of hardened pins extending individually into said openings; a ring on said nose piece; a plurality of drive buttons independently carried by said ring and individually aligned with said hardened pins; and an integral radial ridge on each of said guide buttons.

11. In a headstock for a lathe, the combination, with a spindle rotatably mounted in the headstock, of a nose piece on the spindle having a plurality of openings extending into the nose piece from the outer end thereof in substantial parallelism to the longitudinal axis of said spindle and equidistantly spaced apart; a spring pressed center on said nose piece; a plurality of hardened pins extending individually into said openings; a ring on said nose piece; a plurality of drive buttons independently carried by said ring and individually aligned with said hardened pins; an integral radial ridge on each of said guide buttons; and a pair of inclined sides on each radial ridge, the leading inclined side of each pair on each ridge being disposed at a much greater angle to the respectively adjacent end or surface of a work piece mounted on said center than the angle of the trailing side of each pair.

12. In a lathe, the combination with a headstock casing having front and rear walls, of a pair of aligned first and second bearing means respectively supported in said front and rear walls, the second bearing means in the rear wall having a smaller diameter than that of the first bearing means in the front wall; an elongated spindle extending into the headstock casing with the front end thereof rotatably mounted in the first bearing means and having a reduced rear end rotatably mounted in the smaller second bearing means; a drive gear fixed on said spindle adjacent to said first bearing means and said front wall and at a predetermined distance from said rear wall; thrust bearing means disposed about the reduced rear end of said spindle within said rear wall and taking up the thrust on said spindle; a collar disposed about said reduced end of said spindle within said thrust bearing means and axially retaining the latter bearing means in place; and an elongated sleeve mounted on said spindle and extending from said drive gear to said collar for retaining the latter in place on said spindle.

JUVENTINO JOSE PESQUEIRA.
ROBERT KURZWEIL.

REFERENCES CITED

The following references are of record in the file of this patent:

UNITED STATES PATENTS

| Number | Name | Date |
|---|---|---|
| 379,307 | Codling | Mar. 13, 1888 |
| 1,142,730 | Rockwell | June 8, 1915 |
| 1,285,350 | Palmgren | Nov. 19, 1918 |
| 1,361,120 | Weatherby | Dec. 7, 1920 |
| 1,424,754 | Cullen | Aug. 8, 1922 |
| 1,582,639 | Cullen | Apr. 27, 1926 |
| 1,670,109 | Floeter | May 15, 1928 |
| 1,834,831 | Drummond | Dec. 1, 1931 |
| 1,912,987 | Lovely | June 6, 1933 |
| 1,946,429 | Smith | Feb. 6, 1934 |
| 2,117,960 | Indge | May 17, 1938 |
| 2,333,055 | Terrell | Oct. 26, 1943 |
| 2,401,072 | Himoff | May 28, 1946 |

FOREIGN PATENTS

| Number | Country | Date |
|---|---|---|
| 109,010 | Great Britain | Aug. 30, 1917 |